United States Patent [19]
Paleja et al.

[11] Patent Number: 6,153,658
[45] Date of Patent: Nov. 28, 2000

[54] PROCESS FOR THE PREPARATION OF POLYMER PARTICLES

[75] Inventors: Rakesh Jaysinh Paleja; Dominique Paul Vliers; Maria Johanna Willems, all of Louvain-La-Neuve, Belgium

[73] Assignee: Nova Chemicals (International) S.A., Fribourg, Switzerland

[21] Appl. No.: 09/293,546

[22] Filed: Apr. 16, 1999

[30] Foreign Application Priority Data

Apr. 17, 1998 [EP] European Pat. Off. .............. 98302993

[51] Int. Cl.$^7$ .............................. C08J 9/22; C08J 9/224; C08J 9/228
[52] U.S. Cl. .................. 521/56; 521/57; 521/19; 521/146
[58] Field of Search .................. 521/56, 57, 146

[56] References Cited

U.S. PATENT DOCUMENTS

| | | | |
|---|---|---|---|
| 3,192,169 | 6/1965 | Doar | 521/146 |
| 4,137,388 | 1/1979 | Cutter . | |
| 5,189,069 | 2/1993 | Speikamp et al. . | |
| 5,266,603 | 11/1993 | Holzmeier . | |

FOREIGN PATENT DOCUMENTS 8295756 12/1996 Japan .

OTHER PUBLICATIONS

Search Report dated Jun. 6, 1999.

*Primary Examiner*—Morton Foelak
*Attorney, Agent, or Firm*—Kenneth H. Johnson

[57] ABSTRACT

A process for the preparation of expandable polymer particles containing a polymer of a vinylarene monomer and a foaming agent, which process comprises:

1) polymerizing, by suspension polymerization, 100 parts by weight of a vinylarene monomer, in the presence of 1 to 20 parts by weight of a radical initiator having a half life of 1 hour in benzene at 70 to 110° C., until at least 60% of the vinylarene monomer is polymerized;

400 to 4,900 parts by weight additional vinylarene monomer as well as 0.05 to 1% wt, based on the amount of vinylarene monomer added in step 2, of a radical initiator having a half life of 1 hour in benzene at 70 to 110° C. and polymerizing to completion, in which process the blowing agent can be added before, during or after the polymerization process.

6 Claims, No Drawings

PROCESS FOR THE PREPARATION OF POLYMER PARTICLES

FIELD OF THE INVENTION

The present invention relates to a process for the preparation of expandable polymer particles containing a polymer of a vinylarene monomer and a foaming agent, to polymer particles obtainable by said process and to foamed articles.

BACKGROUND OF THE INVENTION

Expandable polymer particles containing a polymer of a vinylarene monomer, such as polystyrene, are commercially important products that find use in many applications. These applications include thermal insulation and packaging material. In these applications there are also grades being used that are flame-retardant.

The polymer particles are turned into their eventual form by expansion and molding of the particles. It is desirable that the polymer particles should be rapidly foamable, i.e. that upon expansion low densities can be achieved in a short period of time. However, it was found that ways to improve the expandability of the polymer particle often have an adverse effect on particular properties of the final foamed product.

In U.S. Pat. No. 4,525,484 for example, it is taught that when the expandability of polymer particles is improved by the use of conventional low molecular weight plasticizers, this has the disadvantage that when the pre-foamed particles are foamed to give foam moldings, the plasticizers adversely affect the dimensional stability of the moldings. It was furthermore found in U.S. Pat. No. 4,525,484 that improving the expandability of certain polymer particles by using chain transfer agents is only adequate under specific conditions, since the process otherwise results in a polymer which has very high residual monomer content, shrinks greatly on foaming and on sintering give foam moldings having poor dimensional stability. U.S. Pat. No. 4,525,484 therefore discloses a preferred process wherein use is made of styrene oligomers to order to improve the expandability. However, a major drawback of these compounds is that they are expensive and not food-approved, which makes the resulting polymer particles unsuitable for use in e.g. food-packaging applications.

Furthermore, U.S. Pat. No. 4,525,484 teaches that it is essential for its polymer particles showing improved expandability to have a steep high molecular weight flank of the molecular weight distribution curve.

DESCRIPTION OF THE INVENTION

The object of the present invention was to improve the expandability of polymer particles containing a polymer of a vinylarene monomer and a foaming agent without adversely affecting specific properties of the resulting foamed product, especially its strength.

It has surprisingly been found that expandable polymer particles with an excellent expandability that result in products with a good strength can be obtained, when the polymer particle contains a relatively large amount of low molecular weight material. In other words: not the high molecular weight flank of the molecular weight distribution curve is of particular importance, but the low molecular weight flank. Moreover, the process for obtaining such polymer particles does not require the use of additives such as chain transfer agents and styrene oligomers.

Accordingly, the present invention relates to a process for the preparation of expandable polymer particles containing a polymer of a vinylarene monomer and a foaming agent, which process comprises:

1) polymerizing, by suspension polymerization, 100 parts by weight of a vinylarene monomer, in the presence of 1 to 20 parts by weight of a radical initiator having a half life of 1 hour in benzene at 70 to 110° C., until at least 60% of the vinylarene monomer is polymerized;

2) adding to the resulting polymerization mixture 400 to 4,900 parts by weight additional vinylarene monomer as well as 0.05 to 1% wt, based on the amount of vinylarene monomer added in step 2, of a radical initiator having a half life of 1 hour in benzene at 70 to 110° C. and polymerizing to completion, in which process the blowing agent can be added before, during or after the polymerization process.

Both step 1 and step 2 of the process according to the present invention are carried out as a suspension polymerization process. Suspension polymerization of vinylarene monomers is well known in the art and comprises the preparation of a suspension of monomers in water, with aid of conventional suspension stabilisers.

The volume ratio between the organic phase and the aqueous may vary between wide ranges, as will be appreciated by a person skilled in the art. The optimal ratio is determined by economic considerations. In step 1 of the polymerization, suitable volume ratios include the range from 1:20 to 1:4. Suitable volume ratios in step 2 of the polymerization include the range from 1:3 to 4:3, wherein a ratio of around 1:1 is preferred.

Suitable suspension stabilisers for use in the present invention are poly(vinyl alcohol), gelatine, agar, sodium salt of polyacrylic acid and polymethacrylic acid, polyethylene glycol, hydroxyethyl or hydroxymethyl cellulose, carboxy methyl cellulose, methyl cellulose, polyvinyl pyrrolidine, polyacrylamide, copolymer of styrene and maleic acid, preferably in a molar ratio of between 2:1 and 1:2, ethylene glycol or combinations thereof, sodium dodecyl-sulphonate, akali metal salts of fatty acids, watersoluble persulfates (sodium persulphate, potassium persulphate) or sodium-bisulfites. Further, it is possible to use inorganic stabilisers such as alumina, bentonite, magnesium silicate or phosphates, like tricalciumphosphate and/or disodiumhydrogen phosphate, optionally in combination with any of the stabilising compounds mentioned earlier. The amount of stabiliser may suitably vary from 0.1 to 0.9% wt, based on the weight of the aqueous phase.

The vinylarene monomer for use in the present invention can be selected from any aromatic compound that contains a vinyl group. Examples of suitable vinylarene monomers are styrene, α-methylstyrene, p-methylstyrene dimethylstyrene, divinylbenzene and styrenic derivates such as ring-halogenated styrenes. Preferably, the vinylarene monomer is styrene, optionally mixed with at most 50% wt of any other vinylarene, based on the total amount of vinylarene incorporated in the final polyvinylarene. Most preferably, merely styrene is used as the monomer.

In step 1 of the suspension polymerization a first dosage of 100 parts by weight of vinylarene monomer is polymerized until a conversion degree of at least 60% is reached, preferably at least 85%, most preferably at least 90%. For the sake of clarity it is mentioned that these 100 parts by weight represent 2–20% wt of the total amount of vinylarene monomers to be polymerized in step 1 and 2 together, preferably 5–20% by weight. The amount of radical initiator used in step 1 is 1 to 20 parts by weight. Preferably, the amount of radical initiator to be used in step one is from 1 to 15 parts, more preferably from 3 to 10 parts by weight, most preferably, from 4 to 7 parts by weight. The radical initiator used in step 1 typically has a half life of 1 hour in benzene at 70–110 C., preferably at 80–100 C. In particular, the radical initiator is a peroxide compound having these half-life values. Suitable radical initiators for use in step 1 are tert.amylperoxy-pivalate, di(2,4-dichlorobenzoyl) peroxide, tert.butylperoxy-pivalate, di(3,5,5-trimethylhexanoyl)peroxide, didecanoyl-peroxide, dilauroylperoxide, di(2-methylbenzoyl)peroxide, 2,5-dimethyl-2,5-di(2-ethylhexanoyl)hexane, di(4-methylbenzoyl)peroxide, dibenzoyl-peroxide, tert.amylperoxy-2-ethylhexanoate, tert.butylperoxy-2-ethylhexanoate, tert.butylperoxy-isobutyrate, tert.butyl-monoperoxy-maleate. Preferably, dibenzoyl-peroxide and/or dilauroyl-peroxide are used as radical initiator in step 1. The low molecular weight polymers prepared in step 1 typically have a weight average molecular weight ($M_w$) of 1,000 to 30,000 g/mol, more particularly from 10,000 to 30,000 g/mol, most particularly from 20,000 to 30,000 g/mol, as measured in accordance with gel permeation chromatography. The number average molecular weight is from 1,000 to 20,000 g/mol, more particularly from 10,000 to 18,000 g/mol, as measured in accordance with gel permeation chromatography.

In step 2 of the polymerization, 400 to 4,900 parts by weight additional vinylarene monomer are added to the polymerization mixture. Preferably, 400–1,900 parts by weight additional vinylarene monomer are added, more preferably 500–1,700 parts by weight, most preferably 900–1,500 parts by weight. The concentration radical initiator used in step 2 is much lower than in step 1; step 2 comprises the addition of 0.05 to 1 % wt, preferably 0.06 to 0.8 % wt, based on the amount of vinylarene monomers added in step 2, of a radical initiator having a half life of 1 hour in benzene at 70–110 C. Suitable radical initiators used in step 2 are similar to those listed for step 1. If desired, a radical initiator having a half life of 1 hour in benzene at higher temperatures, e.g. 110–135° C. may in addition be used in step 2, like 1,1-di(tert.butylperoxy)-3,3,5-trimethylcyclohexane, 1,1-di(tert.butylperoxy)cyclohexane 2,2-di(tert.butylperoxy)butane, tert.butylperoxy-isopropylcarbonate, tert.butylperoxy-acetate, tert.amylperoxy-benzoate, tert.butylperoxy-benzoate, n-butyl-4,4-di(tert.butylperoxy)valerate, tert.butylperoxy-(2-ethylhexyl)carbonate. However, use of these initiators is not called for. The resulting polymers of step 2 will typically have a $M_w$ of from 100,000 to 500,000 g/mol, preferably from 100,000 to 250,000 g/mol, most preferably from 130,000 to 220,000 g/mol, measured in accordance with gel permeation chromatography. The $M_n$ will typically have a value of 5,000 to 100,000 g/mol preferably from 30,000 to 90,000 g/mol , more preferably of 40,000 to 80,000 g/mol, measured in accordance with gel permeation chromatography.

The polymerization of step 1 is preferably carried out from 70 to 110° C., more preferably from 75 to 100° C., most preferably from 85 to 95° C. The polymerization of step 2 is carried out from 70 to 150° C., preferably from 80 to 140° C., most preferably from 90 to 130° C. In a preferred embodiment of the present invention, after step 1 the reaction temperature is adjusted to 70–75° C. before adding the additional vinylarene monomer and the radical initiator having a half life of 1 hour in benzene at 70–110° C. Subsequently, the temperature is adjusted to a temperature within the range as mentioned for step 2 and the polymerization is continued.

The foaming agent can be any foaming agent known in the art and can be added before, during or after the polymerization process. Preferably, the foaming agent is added during the polymerization reaction, most preferably during step 2 of the polymerization reaction. Typical blowing agents are organic gaseous compounds like $C_{3-6}$ aliphatic hydrocarbons such as propane, butane, pentane, hexane, cyclohexane or halogenated hydrocarbons or more environmentally friendly blowing agents such as water, ethanol, $CO_2$. Preference is given to commercially available pentane, which predominantly consists of n-pentane and iso-pentane.

The amount of foaming agent can be selected by the person skilled in the art from known ranges. Such ranges include 2 to 20 % wt, preferably 3 to 12% wt, based on the amount of vinylarene monomers. In case the (preferred) hydrocarbons are used as blowing agent, these will be emitted into the environment during the expansion process. In view of the undesirability of such emissions, processes are sought which are capable of yielding expandable polymer particles having a reduced amount of foaming agent without deterioration of the expandability of the polymer particles. As an additional advantage, the process of the present invention provides such polymer particles. Apart from polymer particles having excellent expandability that result in products with a good strength, the process according to the invention thus also allows for polymer particles having a relatively low content of foaming agent, i.e. preferably from 3 to 6.5% wt, based on the total amount of vinylarene monomers.

It may be advantageous to polymerize the vinylarene monomers in the presence of other polymers such as polyphenylene oxide, elastomeric polymers, polar polymers or emulsifiers. These other polymers may be added before or during the suspension polymerization of step 1 and/or step 2, or may be formed in-situ previous to the start of suspension polymerization of step 1. Suitable polyphenylene oxides have been described in EP-A-350137, EP-A-403023 and EP-A-391499 (incorporated herein by reference). The polyphenylene oxide is preferably present in an amount of between 1 and 30% wt, based on the amount of vinylarene monomers, and may improve the rigidity of the resulting expandable polymer particle. Examples of suitable elastomeric polymers have also been described in EP-A-350137 and comprise (block) copolymers of vinyl substituted aromatic monomer and a conjugated diene monomer. These elastomeric polymers are preferably present in an amount of 0.5 to 10% wt, based on the amount of vinylarene monomers, and may improve the impact strength of the resulting expandable polymer particles. Examples of polar polymers have been described in e.g. WO 98/01501 and comprise e.g. starch, and starch modified by esterification or etherification. Examples of suitable emulsifiers are described e.g. WO 98/01488 and WO/01489 and comprise e.g. bisalkylsulphosuccinates, sorbitol-$C_8$–$C_{20}$-carboxylates, and $C_8$–$C_{20}$-alkylxylene sulphonates.

Vinylarene strains can be crosslinked by using crosslinking agents having one or more unsaturated carbon-carbon bonds. Examples of suitable crosslinking agents are butadiene, isoprene, divinyladipate, and divinylbenzene. The latter compound is the most suitable because of its complete compatibility with the vinylarene monomers. When using crosslinking agents, the polymerization is preferably carried out in the presence of a relatively small amount of crosslinking agent, e.g. from 0.001 to 0.1% wt, based on the amount of vinylarene monomers.

If desired for one reason or the other, the polymerization process may be carried out in the presence of a chain transfer agent. The person skilled in the art will appreciate that these chain transfer agents can be selected from mercaptans, such as $C_2-C_{15}$-alkyl mercaptans, e.g. n-dodecylmercaptan, n-butyl mercaptan or t-butyl mercaptan. Preferred are aromatic compounds such as pentaphenyl ethane and the dimer of α-methyl styrene. However, as said at the beginning of this patent document, the use of chain transfer agents in the process of the present invention is not required.

In view of their distinguishing features and improved properties, it is evident that the resulting expandable polymer particles of the process of the present invention are novel. Since the concentration of the radical initiator in step 1 is relatively high compared to conventional suspension polymerization of e.g. polystyrene, the resulting polymer particles according to the invention will contain a significantly higher amount of polymer chains of vinylarene monomers having a low molecular weight compared to e.g. conventional polystyrene. Accordingly, the present invention also relates to expandable polymer particles containing a polymer of a vinylarene monomer and a foaming agent, which particles contain from 2.5 to 6% by weight of polymer chains of vinylarene monomers having a molecular weight of from 10,000 to 20,000 g/mol, based on the weight of the total amount of polymers of vinylarene monomer in the particle, as measured in accordance with gel permeation chromatography (using polystyrene calibration). More preferably, the particles contain from 3 to 5% by weight of polymer chains of vinylarene monomers having a molecular weight of from 10,000 to 20,000 g/mol.

It will be appreciated that the expandable polymer particles of the present invention may also contain additional additives or coatings in effective amounts which can be added before, during or after the polymerization. Such additives include regulators for foam porosity, nucleating agents such as waxes, like polyethylene wax or paraffin wax, dyes, fillers, lubricants, stabilisers, which are well-known in the art. Of particular interest are flame-retarding compounds like described in U.S. Pat. No. 4,525,484 and comprise compounds which are based on organic bromine or chlorine compounds such as trisdibromopropyl phosphate, hexabromocyclododecane, chloroparaffin, as well as substances which act synergistically with flame retardants such as dicumylperoxides and other organic peroxides which decompose at high temperatures. Also important are coating compositions containing glycerol- or metal carboxylates. Such compounds reduce the tendency of the particles to agglomerate. Suitable carboxylates are glycerol mono-, di- and/or tristearate and zinc stearate. The coating compositions are deposited on the particles via known methods, e.g. via dry-coating in a ribbon blender or via slurry solution in a readily vaporizing liquid.

The expandable polymer particles according to the present invention advantageously have an average diameter of 0.1 to 6 mm, preferably 0.4 to 3 mm.

The expandable polymer particles can be pre-foamed by conventional methods, e.g by using (super heated) steam to yield particles having reduced density, e.g. from 50 to 10 kg/m³, more preferably from 35 to 10 kg/m³. Foaming can also be effected by heating in oil, e.g. silicone oil, or by microwaves.

The pre-foamed polymer particles can be further converted into foamed articles in any conventional way, e.g. molding.

The present invention also relates to foamed articles which are obtainable upon expansion of expandable polymer particles containing a polymer of a vinylarene monomer according to the present invention.

The present invention will be further illustrated by means of the following non-limiting examples. In the examples the following ingredients have been used:

GMS: a conventional mixture of glycerol monostearate, glycerol distearate, and glycerol tristearate. Conventional coating agent whose function it is to prevent agglomeration and static of the expandable beads, SM: styrene monomer, LPO: dilauroyl peroxide, having a half life of 1 hour in benzene at 80° C., BPO: dibenzoyl peroxide, having a half life of 1 hour in benzene at 91° C., BPIC: tert.butyl peroxy isopropyl carbonate, having a half life of 1 hour in benzene at 117° C., tBEHC: tert.butyl peroxy-(2-ethylhexyl)carbonate, having a half life of 1 hour in benzene at 122° C.

DMS: dimer of α methyl styrene.

Preparation of Polymer Particles

EXAMPLES 1–3

In a 9 liter autoclave, 4.4 liter demineralised water was mixed with a first dosage of 364 gram SM (400 ml), 9.8 gram tricalciumphosphate, 7.0 gram disodium hydrogen phosphate and 0.03 gram potassium persulphate while stirring at 500 rpm.

The temperature of the resulting mixture was raised from 20° C. to 65° C., and LPO was added in quantities ranging from 25.6 gram to 54.9 gram (see Table 1). Hereinafter, the temperature suspension was raised to 90° C., where it was kept for 1 hour. Subsequently, the resulting polymerization mixture was cooled down to 70° C. to add additional 2912 grams SM (3200 ml) as well as 8.7 gram BPO, 5.8 gram BPIC and 3.3 gram of a paraffin wax. After 10 minutes of stirring at 70° C., the temperature was raised to 90° C. where the polymerization was continued for approximately 4 hours. Subsequently, the reactor was closed, pentane was added and the polymerization was continued for approximately 1 hour at 96° C. and 3 hours at 130° C. After finishing the polymerization, the reaction mixture was cooled.

EXAMPLE 4

The procedure as described for Examples 1–3 was repeated, with the following differences:

At the start of the polymerization, a first dosage of 198 gram SM was added (218 ml) instead of 364 gram (400 ml).

At 65° C., 39.6 gram LPO was added in the presence of 0.7 gram DMS (0.35 % wt, based on the first SM dosage).

At 70° C., 3078 gram additional SM was added (instead of 2912 gram), 9.2 gram BPO (instead of 8.7 gram) and 6.2 gram BPIC (instead of 5.8 gram).

COMPARATIVE EXAMPLE A

A reference sample, "A", representing conventional expandable polystyrene polymer particles was prepared as follows.

In a 9 liter autoclave, 4.4 liter demineralised water (55 vol %) was mixed with 3276 gram SM (3600 ml), 9.8 gram tricalciumphosphate, 7.0 gram disodium hydrogen phosphate, 0.03 gram potassium persulphate and 3.3 gram paraffin wax, while stirring at 500 rpm.

The temperature of the resulting mixture was raised from 20° C. to 65° C., where 11.5 gram BPO, and 6.6 gram BPIC were added. Hereafter, the temperature was raised to 90° C. where it was kept for 3.5 hours. Subsequently, the reactor was closed, the temperature was raised to 96° C., pentane was added and the polymerization was continued for approximately 1 hour at 96° C. and 3 hours at 130° C. After finishing the polymerization, the reaction mixture was cooled.

EXAMPLE 5

61 liter demineralised water was mixed with a first dosage of 4641 gram SM, 201 gram tricalciumphosphate and further conventional stabilising additives, while stirring at 170 rpm.

The temperature of the resulting mixture was raised from 20° C. to 90° C., and 192 grams BPO were added. The polymerization mixture was kept at 90° C. for one hour. Subsequently, the polymerization mixture was cooled down to 70° C. to add additional 70,889 grams SM as well as 61.5 gram BPO, 80.36 gram tBEHC, 34.5 gram BPIC, and 51.2 grams DMS. After stirring a few minutes at 70° C., the temperature was raised to 90° C. where the polymerization was continued for approximately 4 hours. Subsequently, the reactor was closed, 6.1 liter pentane was added and the polymerization was continued for approximately 1 hour at 96° C. and 3 hours at 122° C. After finishing the polymerization, the reaction mixture was cooled.

The resulting particles contained 3.0% by weight of polystyrene chains having a molecular weight of from 10,000 to 20,000 g/mol, based on the total weight of polystyrene in the particle, as determined by gel permeation chromatography.

COMPARATIVE EXAMPLE B 76 liter demineralised water was mixed with 75,712 gram SM, 222 gram tricalciumphosphate and further conventional stabilising additives, while stirring at 170 rpm.

The temperature of the resulting mixture was raised from 20° C. to around 90° C., where 54 grams BPO, 171.5 grams tBEHC, 37.5 grams BPIC and 55 grams DMS were added. The polymerization was kept at 90° C. for about 3.5 hours. Subsequently, 5.5 liter pentane was added. The polymerization was continued for approximately 1 hour at 96° C. and 3 hours at 122° C. After finishing the polymerization, the reaction mixture was cooled.

The resulting particles contained 1.7% by weight of polystyrene chains having a molecular weight of from 10,000 to 20,000 g/mol, based on the total weight of polystyrene in the particle, as determined by gel permeation chromatography.

Pre-expansion and Molding Performance Examples 1–4 and Comparative Experiment A A fraction of polymer particles of Examples 1–4 and comparative example A having a particle size of 0.7–1.2 mm were selected. The raw beads so prepared were tumbled in a ribbon blender (a Hermann Linden machine for 1 kg batches, run for 10 minutes) with a coating composition comprising 5:1 GMS/zinc stearate until an uptake of 4.8 g (0.48% wt) was achieved.

The coated beads were pre-expanded in a batch pre-expander (of the firm Händle) using a steam pressure of 0.20 bar gauge. The expansion of the polymer particles was determined by measuring their pre-foam density reached after 25 seconds ($D_{25}$) and the steaming time required to achieve a density of about 20 g/l ($t_{20}$)

Subsequently, the pre-expanded polymer particles with a density close to 20 gram/l were taken and allowed to mature for 24 hours in an air-permeable silo and were machine moulded (Kurtz contour molding machine) into standard tiles of 300 mm by 300 mm by 50 mm using steam pressures of 0.4 and 0.5 bar gauge. Next, the tiles were dried for 48 hours in an oven at 70° C. and the cross-breaking strength was measured on an Instron tensile tester. The test was based on DIN 53423 except for using a distance between the support bars of 150 mm, a diameter of support bars and pressure bar of 15 mm and a test speed of 500 mm/min.

The results are shown in Table 1.

Pre-expansion and Molding Performance Example 5 and Comparative Experiment B A fraction of polymer particles of Example 5 and comparative example B having a particle size of 0.7–0.9 mm were selected. The raw beads so prepared were tumbled in a ribbon blender for 30–60 minutes with a coating composition comprising 3:1 GMS/zinc stearate until an uptake of 0.28% wt was achieved.

The coated beads of example 5 were pre-expanded in a batch pre-expander (of the firm Kurtz) using a steam pressure of 0.20 bar gauge. The coated beads of comparative example B were pre-expanded using a steam pressure of 0.4 bar gauge. The expansion of the polymer particles was determined by measuring their pre-foam density reached after 25 seconds ($D_{25}$) and the steaming time required to achieve a density of about 30 g/l ($t_{30}$).

Subsequently, the pre-expanded polymer particles with a density close to 35 gram/l were taken and allowed to mature for 24 hours in an air-permeable bag and were machine moulded (Kurtz contour molding machine) into standard tiles of 300 mm by 300 mm by 50 mm using steam pressures of 1.0 and 1.2 bar gauge. Next, the tiles were dried for 48 hours in an oven at 70° C. and the cross-breaking strength was measured. The test was based on DIN 53423 except for using a distance between support bars of 150 mm, a diameter of support bars and pressure bar of 15 mm and a test speed of 500 mm/min.

The results are shown in Table 2.

TABLE 1

| EXAMPLE | A | 1 | 2 | 3 | 4 |
|---|---|---|---|---|---|
| Ingredients | | | | | |
| SM first dosage (gram) | 3276 | 364 | 364 | 364 | 198 |
| SM additional dosage (gram) | — | 2912 | 2912 | 2912 | 3078 |
| LPO (gram) | — | 25.6 | 36.6 | 54.9 | 39.6 |
| Pentane in raw polymer particle (% wt)[1] | 5.7 | 6.1 | 5.7 | 5.7 | 5.6 |
| Properties | | | | | |
| $D_{25}$ (g/l) | 19.7 | 17.5 | 16.7 | 15.4 | 15.6 |
| $t_{20}$ (sec) | 25.0 | 19.5 | 19.2 | ND[2] | 18.7 |
| Cross-breaking strength at 0.4 bar g steam pressure (N) | 785 | 872 | 864 | 1017 | 969 |
| Cross-breaking strength at 0.5 bar g steam pressure (N) | 958 | 1090 | 1141 | 1033 | 1048 |

[1]based on the weight of the raw polymer particle
[2]Not Determined

TABLE 2

| EXAMPLE | 5 | B |
|---|---|---|
| Ingredients | | |
| SM first dosage (gram) | 4641 | 75,717 |
| SM additional dosage (gram) | 70,889 | — |
| BPO (gram)[1] | 192 | 54 |
| Pentane in raw polymer particle (% wt)[2] | 4.1 | 4.1 |
| polystyrene chains having a molecular weight of from 10,000 to 20,000 (% wt)[3] | 3.0 | 1.7 |
| Properties | | |
| $D_{25}$ (g/l) | 25.8 | 33.4 |
| $t_{30}$ (sec) | 5 | 32 |
| Cross-breaking strength at 1.0 bar g steam pressure (N) | 2230 | 1630 |
| Cross-breaking strength at 1.2 bar g steam pressure (N) | 2220 | 1730 |

[1] dosed in first step
[2] based on the weight of the raw polymer particle
[3] based on the total weight of polystyrene in the particle, as measure in accordance with gel permeation chromatography Table 1 and 2 show that the expandable polystyrene particles according to the invention show an improved expandability over the reference samples in view of their reduced $D_{25}$ and $t_{20}$ or $t_{30}$ values.

The cross-breaking strength is a measure for the fusion of the polymer particles in the mould. The higher the cross-breaking strength for a material, moulded at a given steam pressure, the better the fusion of the particles, the stronger the resulting moulded material. The values for cross-breaking strength of the examples of the invention show that the strength of the resulting foamed products is not adversely affected, on the contrary, all Examples according to the invention outperform the reference samples in this aspect.

What is claimed is:

1. A process for the preparation of expandable polymer particles containing a polymer of a vinylarene monomer, said polymer comprising from 2.5 to 6% by weight of polymer chains having a molecular weight from 10,000 to 20,000 g/mol as measured in accordance with gel permeation chromatography of vinylarene monomer and from 3 to 12 weight % based on the weight of vinylarene polymer of a blowing agent, which process comprises:

1) polymerizing, by suspension polymerization at a temperature from 75 to 100° C., 100 parts by weight of a vinylarene monomer, in the presence of 3 to 10 parts by weight of a radical initiator having a half life of one hour in benzene at 70 to 110° C., until at least 60% of the vinylarene monomer is polymerized;

2) cooling the reaction mixture to a temperature from 70 to 75° C.; and 3) adding to the resulting polymerization mixture 400 to 4,900 parts by weight additional vinylarene monomer as well as 0.05 to 1 weight % based on the amount of vinylarene monomer added in step 3, of a radical initiator having a half life of 1 hour in benzene at 70 to 110° C. and polymerizing at a temperature from 80 to 140° C. to completion, in which process the blowing agent can be added before, during or after the polymerization process.

2. The process according to claim 1, wherein in step 2, 400–1,900 parts by weight additional vinylarene monomer are added.

3. The process according to claim 1, wherein in step 2, 500–1,700 parts by weight additional vinylarene monomer are added.

4. The process as claimed in claim 1 wherein the amount of radical initiator in step 1 is from 1 to 15 parts by weight.

5. The process according to claim 1, wherein the radical initiator of both step 1 and 2 has a half life of 1 hour in benzene at 80–100° C.

6. The process according to claim 1, wherein the radical initiator in both step 1 and 2 is selected from dilauroylperoxide and dibenzoylperoxide.

* * * * *